(12) United States Patent
Thomas (10) Patent No.: US 11,885,591 B2
(45) Date of Patent: *Jan. 30, 2024

(54) RIFLESCOPE WITH FEEDBACK DISPLAY AND RELATED METHODS

(71) Applicant: GUNWERKS, LLC, Cody, WY (US)

(72) Inventor: Christopher Ryan Thomas, Ramona, CA (US)

(73) Assignee: GUNWERKS, LLC, Cody, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/477,937

(22) Filed: Sep. 17, 2021

(65) Prior Publication Data

US 2022/0003522 A1    Jan. 6, 2022

Related U.S. Application Data

(63) Continuation of application No. 16/400,908, filed on May 1, 2019, now Pat. No. 11,125,534, which is a
(Continued)

(51) Int. Cl.
*G02B 23/00* (2006.01)
*F41G 1/473* (2006.01)
(Continued)

(52) U.S. Cl.
CPC ............... *F41G 1/473* (2013.01); *F41G 1/38* (2013.01); *G02B 23/14* (2013.01); *G02B 27/36* (2013.01)

(58) Field of Classification Search
CPC ........ G02B 23/00; G02B 23/02; G02B 23/04; G02B 23/10; G02B 23/105; G02B 23/12;
(Continued)

(56) References Cited

U.S. PATENT DOCUMENTS

RE28,847 E    6/1976  Vizenor
4,248,496 A   2/1981  Akin et al.
(Continued)

FOREIGN PATENT DOCUMENTS

EP    1340956 A2    9/2003
EP    1772695 A1    4/2007

OTHER PUBLICATIONS

International Search Report dated Nov. 6, 2014 as received in Application No. PCT/US2014/048312.
(Continued)

*Primary Examiner* — Thong Q Nguyen
(74) *Attorney, Agent, or Firm* — DORSEY & WHITNEY LLP (57) ABSTRACT

A riflescope having a display that provides information to a user of the riflescope, along with related methods, is provided herein. In one embodiment, a riflescope includes an objective system and an ocular system, wherein a focal plane is defined between the objective system and the ocular system. A display system, comprising a display and a mirror, is positioned at a location between the focal plane and the ocular system. In one embodiment, the distance between the focal plane and the ocular system is equal to a sum of a distance between the display and the mirror and a distance between the mirror and the ocular system.

13 Claims, 6 Drawing Sheets

Related U.S. Application Data continuation of application No. 15/581,244, filed on Apr. 28, 2017, now Pat. No. 10,480,901, which is a continuation-in-part of application No. 14/326,350, filed on Jul. 8, 2014, now abandoned.

(60) Provisional application No. 61/860,224, filed on Jul. 30, 2013.

(51) Int. Cl.
    *F41G 1/38* (2006.01)
    *G02B 23/14* (2006.01)
    *G02B 27/36* (2006.01)

(58) Field of Classification Search
    CPC ............... G02B 23/14; G02B 23/2476; G02B 27/0101; G02B 27/0179; G02B 27/0189; G02B 27/02; G02B 27/022; F41G 1/38; F41G 1/473
    USPC .................................................. 359/399–433
    See application file for complete search history.

(56) References Cited

U.S. PATENT DOCUMENTS

| | | | |
|---|---|---|---|
| 4,561,204 A | 12/1985 | Binion | |
| 5,721,641 A | 2/1998 | Aoki | |
| 5,839,007 A | 11/1998 | Kawakami | |
| 6,498,902 B2 | 12/2002 | Kanai | |
| 6,862,832 B2 | 3/2005 | Barrett | |
| 7,124,531 B1 | 10/2006 | Florence et al. | |
| 7,296,358 B1 | 11/2007 | Murphy et al. | |
| 8,001,714 B2 | 8/2011 | Davidson | |
| 8,051,597 B1 | 11/2011 | D'Souza et al. | |
| 8,353,454 B2 | 1/2013 | Sammut et al. | |
| 8,365,455 B2 | 2/2013 | Davidson | |
| 8,448,372 B2 | 5/2013 | Peters et al. | |
| 8,468,930 B1 | 6/2013 | Bell | |
| 8,713,843 B2 | 5/2014 | Windauer | |
| 8,826,583 B2 | 9/2014 | Kepler et al. | |
| 8,833,655 B2 | 9/2014 | McCarty et al. | |
| 8,860,831 B1 * | 10/2014 | Burton | H04N 5/332 348/222.1 |
| 9,429,390 B2 * | 8/2016 | Stockdill | G02B 23/16 |
| 9,939,229 B2 | 4/2018 | Davidson et al. | |
| 10,480,901 B2 | 11/2019 | Thomas | |
| 2002/0191282 A1 | 12/2002 | Edwards | |
| 2004/0020099 A1 | 2/2004 | Osborn | |
| 2004/0025396 A1 | 2/2004 | Schlierbach et al. | |
| 2004/0201886 A1 | 10/2004 | Skinner et al. | |
| 2006/0201047 A1 | 9/2006 | Lowrey | |
| 2006/0254115 A1 | 11/2006 | Thomas et al. | |
| 2007/0035824 A1 | 2/2007 | Scholz | |
| 2007/0097351 A1 | 5/2007 | York et al. | |
| 2007/0209268 A1 | 9/2007 | Birurakis et al. | |
| 2007/0234626 A1 | 10/2007 | Murdock et al. | |
| 2007/0277421 A1 | 12/2007 | Perkins et al. | |
| 2008/0039962 A1 | 2/2008 | McRae | |
| 2008/0290164 A1 | 11/2008 | Papale et al. | |
| 2009/0200376 A1 | 8/2009 | Peters et al. | |
| 2009/0205239 A1 | 8/2009 | Smith | |
| 2009/0320348 A1 | 12/2009 | Kelly | |
| 2011/0162250 A1 | 7/2011 | Windauer et al. | |
| 2012/0186131 A1 | 7/2012 | Windauer | |
| 2013/0033746 A1 | 2/2013 | Brumfield | |
| 2013/0167425 A1 | 7/2013 | Crispin | |
| 2013/0199074 A1 | 8/2013 | Paterson et al. | |
| 2013/0279013 A1 | 10/2013 | Edwards et al. | |
| 2013/0308182 A1 | 11/2013 | Blagov et al. | |
| 2014/0026464 A1 | 1/2014 | Wiklund | |
| 2014/0059915 A1 | 3/2014 | Sammut et al. | |
| 2014/0075820 A1 | 3/2014 | Ben-Ami | |
| 2014/0101982 A1 | 4/2014 | McPhee | |
| 2014/0110482 A1 | 4/2014 | Bay | |
| 2014/0182187 A1 | 7/2014 | McHale | |
| 2014/0290114 A1 | 10/2014 | Thomas et al. | |
| 2015/0106046 A1 | 4/2015 | Chen et al. | |
| 2015/0247702 A1 | 9/2015 | Davidson et al. | |
| 2016/0061567 A1 | 3/2016 | Regan et al. | |
| 2019/0072754 A1 | 3/2019 | Lv | |
| 2019/0219813 A1 * | 7/2019 | Summerfield | G02B 27/142 |

OTHER PUBLICATIONS

Written Opinion of the International Searching Authority dated Nov. 6, 2014 as received in Application No. PCT/US2014/048312.

* cited by examiner

RIFLESCOPE WITH FEEDBACK DISPLAY AND RELATED METHODS

CROSS-REFERENCE TO RELATED APPLICATIONS

This application is a continuation of U.S. patent application Ser. No. 16/400,908, filed May 1, 2019, now U.S. Pat. No. 11,125,534, which is a continuation of U.S. patent application Ser. No. 15/581,244, filed Apr. 28, 2017, now U.S. Pat. No. 10,480,901, which is a continuation-in-part of U.S. patent application Ser. No. 14/326,350, filed Jul. 8, 2014, now abandoned, which claims the benefit of U.S. Provisional Patent Application No. 61/860,224, filed on Jul. 30, 2013, the disclosures of each of which are incorporated by reference herein in their entireties.

BACKGROUND

Firearms, such as rifles are used for a variety of purposes, including for sport, military and other protective services. Often times, rifles are used to shoot a target at very long ranges (e.g., in excess of 500 yards). In order to accommodate the sighting of a target at such ranges, riflescopes are often employed. A riflescope includes optics that magnify the view of the target and also help to aim the rifle for purposes of accuracy and precision. For example, a riflescope may include a reticle or other aiming point positioned in the field of view that is provided by the optics of the riflescope, the aiming point being aligned with a target by a user prior to firing the rifle. The aiming point may be adjustable so that a shooter may position the aiming point relative to the rifle in order to compensate for one or more factors that affect the travel of a bullet during its flight toward the target.

For example, factors such as bullet drop (e.g., the influence of gravity on a moving bullet), the Magnus effect, the Coriolis effect, ballistics specific considerations, as well as other factors may impact the path of a bullet when fired over relatively long distances. Thus, the ability to compensate for these factors by positioning the aiming point of the riflescope has been an important aspect in long range shooting.

Through the development of new technologies, riflescopes have become more and more sophisticated and have incorporated various electronic components into their designs. For example, U.S. patent application Ser. No. 14/326,350 (published as U.S. Patent Publication No. 2015/0247702, and to which this application claims priority), describes a riflescope having various components such as a processor, memory, a feedback display, one or more sensors, and a variety of other components including input and output devices. As riflescopes become more sophisticated and technologically advanced, it becomes more difficult to provide substantial amounts of information to the viewer in a manner that is unobtrusive and does not take away from the experience of viewing a live scene through the optics of the riflescope.

It is a continual desire within the industry to provide enhanced optics that provide a user with an improved viewing experience, including the advanced information provided by an associated electronic system as well as the view of a live scene through the optics.

BRIEF SUMMARY OF THE INVENTION

Embodiments of the present disclosure provide optical devices, such as a riflescope, having an internal display that provides information to a user of the riflescope such as adjusted settings, distance to target, atmospheric or environmental conditions, or system data or instructions.

In accordance with one embodiment, a riflescope is provided including a main tube, an objective system coupled to a first end of the main tube and an ocular system coupled to a second end of the main tube. The main tube, the objective system and the ocular system are cooperatively configured to define at least one focal plane. The rifle scope further includes a display system comprising a display and a mirror, wherein the display and the mirror are positioned between the at least one focal plane and the ocular system.

In one embodiment, the display is configured to emit light in a direction that is substantially perpendicular to an optical axis of the riflescope.

In one embodiment, the mirror is oriented at an angle of approximately 45° relative to the emitted light of the display.

In one embodiment, the at least one focal plane is positioned a first distance from a defined point of the ocular system, the display is positioned a second distance from the mirror, and the mirror is positioned a third distance from the defined point of the ocular system, the first distance being different from either the second distance or the third distance.

In one particular embodiment, the sum of the second distance and the third distance equals the first distance.

In one embodiment, the display and the mirror are located on a common side of the riflescope body.

In one embodiment, the display and the mirror are located on diametrically opposite sides of the riflescope body.

In one embodiment, the riflescope further comprises a reticle.

In one embodiment, the riflescope further comprises an erector system located within the main tube.

In one embodiment, the riflescope further comprises a processor in electronic communication with the display.

In various embodiments, the riflescope may include memory, at least one sensor, and/or an electronic communication device in electronic communication with the processor.

In accordance with another embodiment of the present invention, a method of of providing information to a user of a riflescope is set forth. The method comprises providing a riflescope having an objective system and an ocular system, a focal plane being defined between the objective system and the ocular system. The method further includes disposing a display between the focal plane and the ocular system, emitting light from the display in a direction that is non-parallel to an optical axis of the riflescope and reflecting the emitted light to the ocular system, wherein the reflected light is arranged as indicia containing information for the user of riflescope.

In one embodiment, the focal plane is positioned at a first distance from the ocular system, and the method further comprises positioning the display at a second distance from the mirror and positioning the mirror at a third distance from the ocular system such that the first distance is different from the second distance and the third distance.

In one embodiment, the method further comprises locating the mirror and the display such that the sum of the second distance and the third distance equals the first distance.

Features, components, steps or aspects of one embodiment described herein may be combined with features, components, steps or aspects of other embodiments without limitation.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Embodiments of an optical device, such as a riflescope for long range shooting, are provided herein. The riflescope may include an electronic display which provides information to a user in a manner that does not require the user to lift their eye from the riflescope or alter their focus while looking through the riflescope. In various embodiments, the display may provide information related to, for example, the aiming point of the riflescope, the distance to target, a compensation factor associated with the aiming point, ballistics information, environmental information, or system information relating to the operation of the electronics of the riflescope.

Figure 1:
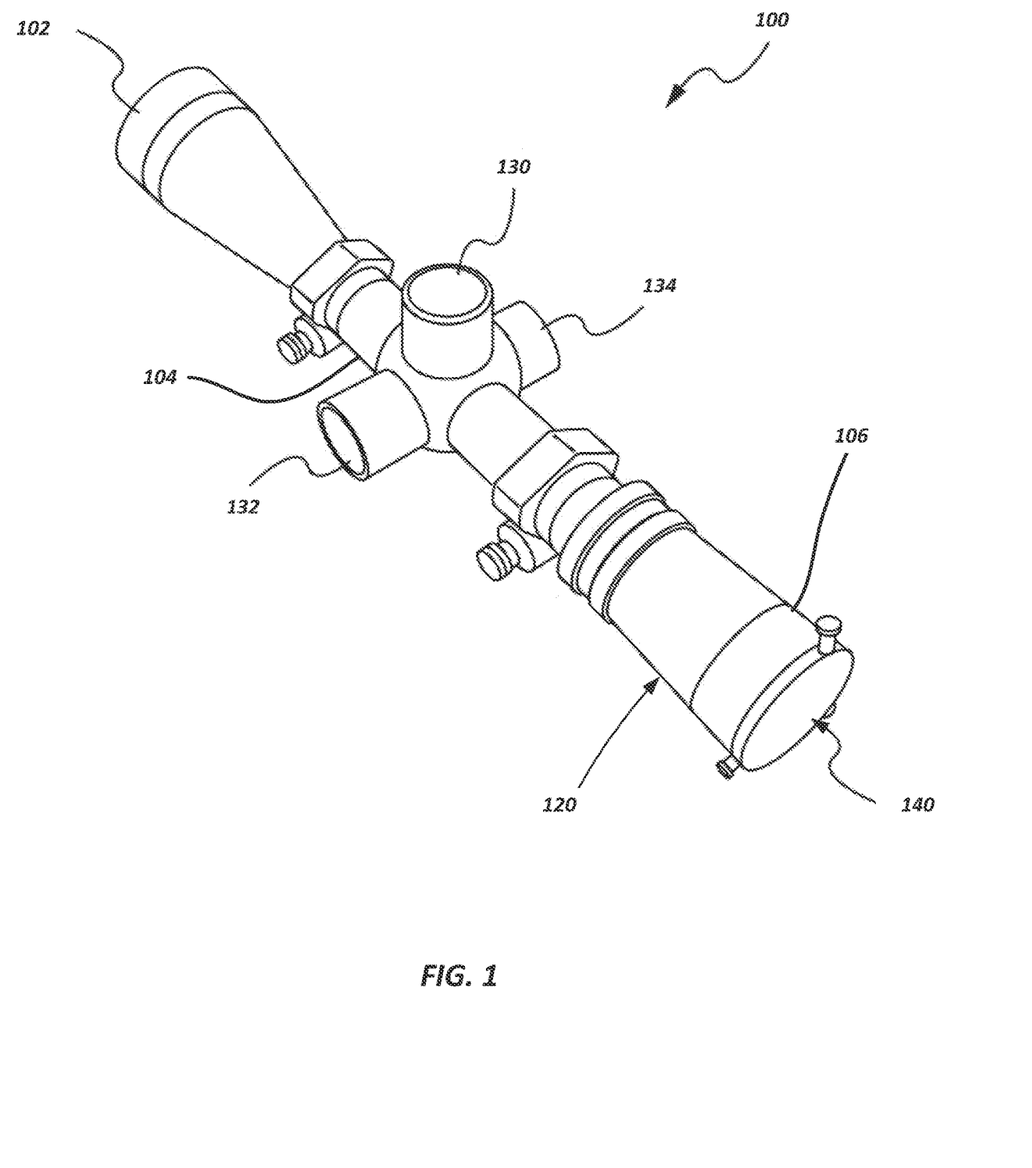
FIG. 1 is a perspective view of a riflescope according to an embodiment of the disclosure.
Figure 2:
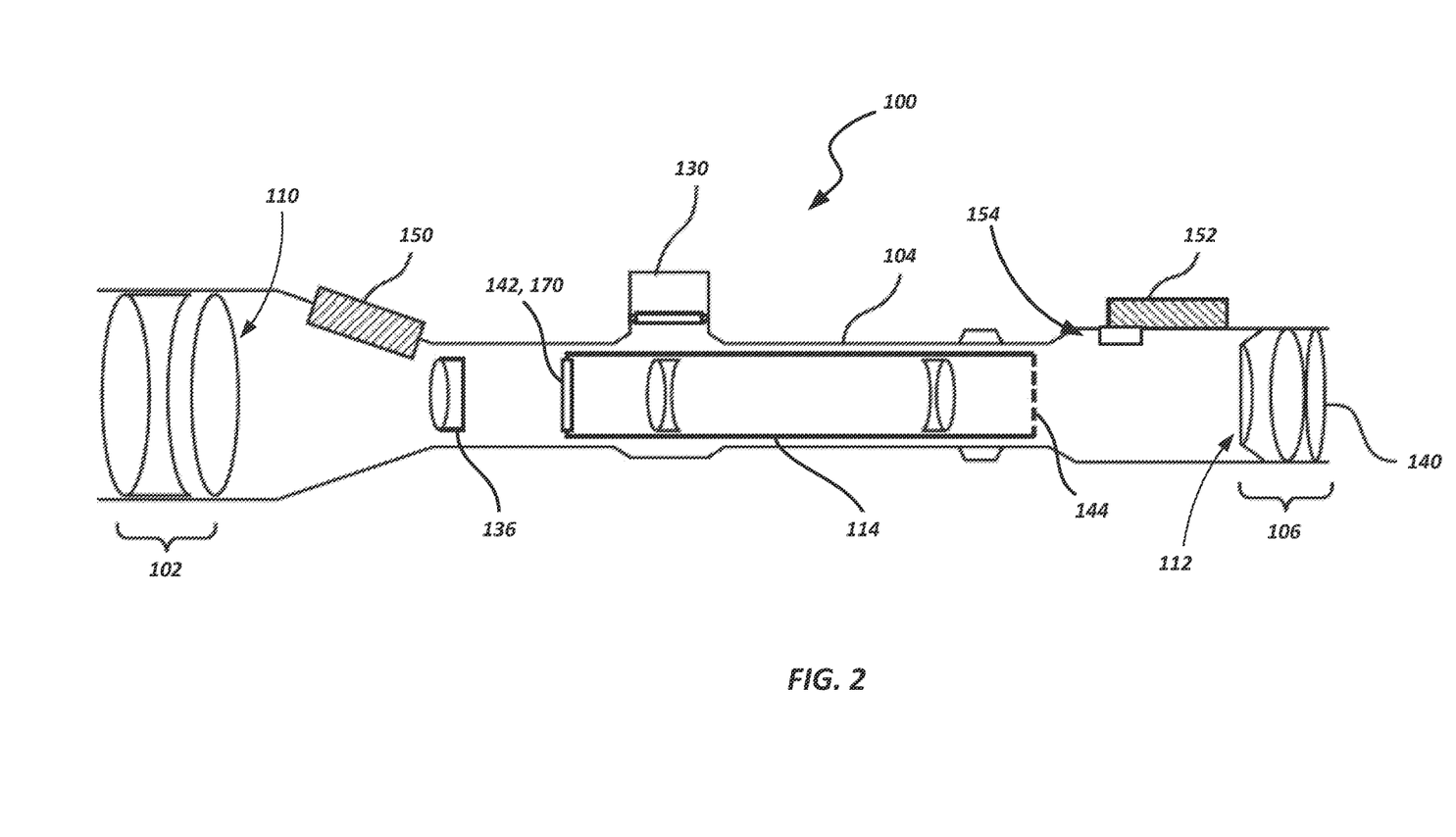
FIG. 2 is a schematic view of a riflescope illustrating the optics train according to an embodiment of the present disclosure.

Referring to FIGS. 1 and 2, a riflescope 100 is shown in accordance with an embodiment of the present disclosure. The riflescope 100 may include an objective system 102, a main tube 104, and an ocular system 106. The objective system 102 includes one or more lenses 110 and is positioned at the distal end of the riflescope 100 (i.e., the farthest away from a user's eye during use). The ocular system 106 also includes one or more lenses 112 and is located at a proximal end of the riflescope 100. A plurality of optical elements may also be disposed within the main tube 104. For example, an erector system 114 may be contained within the main tube 104 to invert the image so that a user sees the image in a "right side up" orientation when looking through the riflescope 100. A magnification ring 120 (also referred to as a power ring) may be used to vary the magnification of the image being viewed though riflescope by adjusting the relative position of various optical elements disposed within the riflescope 100.

The riflescope 100 may also include a number of adjustment mechanisms including, for example, an elevation adjustment knob 130, a parallax dial 132, and a windage adjustment knob 134. The elevation adjustment knob 130 may be used to adjust vertical position of a reticle within the body of the riflescope. Likewise, the windage adjustment knob 134 may be used to adjust the horizontal position of reticle within the body of the riflescope. The parallax dial 132 may be used to adjust target focus and/or correct parallax (e.g., such as by repositioning a focus lens 136).

The ocular system 106 may include an eyepiece 140 through which the user may view a target through the riflescope 100. In some embodiments, the ocular system 106 may be adjusted to correct for the user's vision (sometimes referred to as a diopter adjustment). For example, the ocular system 106, or a portion thereof, may be rotated or adjusted relative to the main tube 104 to change the focus of the riflescope 100. In some embodiments, once adjusted, the ocular system 106 (or adjusted portion thereof) may be locked into place with a locking ring or other mechanism.

The various optical elements (e.g., lenses associated the objective system 102, the focus lens 136 and the erector system 114) may be arranged to provide a first focal plane 142 and a second focal plane 144. Light rays converge to provide an "in focus" image at the focal planes. The image at the first focal plane 142 is conventionally inverted due to the arrangement of lenses in the objective system, while the image at the second focal plane 144 is in and "upright" orientation, or as a user would expect to view the image if the riflescope 100 was not being used.

As shown in FIG. 2, the riflescope 100 may also include various electronic components. For example, the riflescope 100 may include a battery 150 and a control module 152 (or computational system). A display system 154 may be in communication with, or otherwise associated with, the control module 152. In some embodiments, the battery 150 and the control module 152 may be enclosed within the housing or body of the riflescope. In some embodiments, the battery 150 and/or the control module 152 may be coupled to an exterior portion of the riflescope. Additionally, while these components are schematically shown as being located at certain positions in FIG. 2 (i.e., with the battery shown near the objective system 102 and the control module 152 near the ocular system 106), such should not be considered limiting. Rather, the electronic components may be positioned at a variety of locations and may be incorporated in a variety of designs or configurations. For example, in one embodiment, the battery may be housed in a lever associated with a rotatable ring (e.g., the magnification ring 120) such as is described in U.S. patent application Ser. No. 15/458,406 entitled GUN SCOPE WITH BATTERY COMPARTMENT and filed on Mar. 14, 2017, now U.S. Pat. No. 9,939,229, the disclosure of which is incorporated by reference herein.

Figure 3:
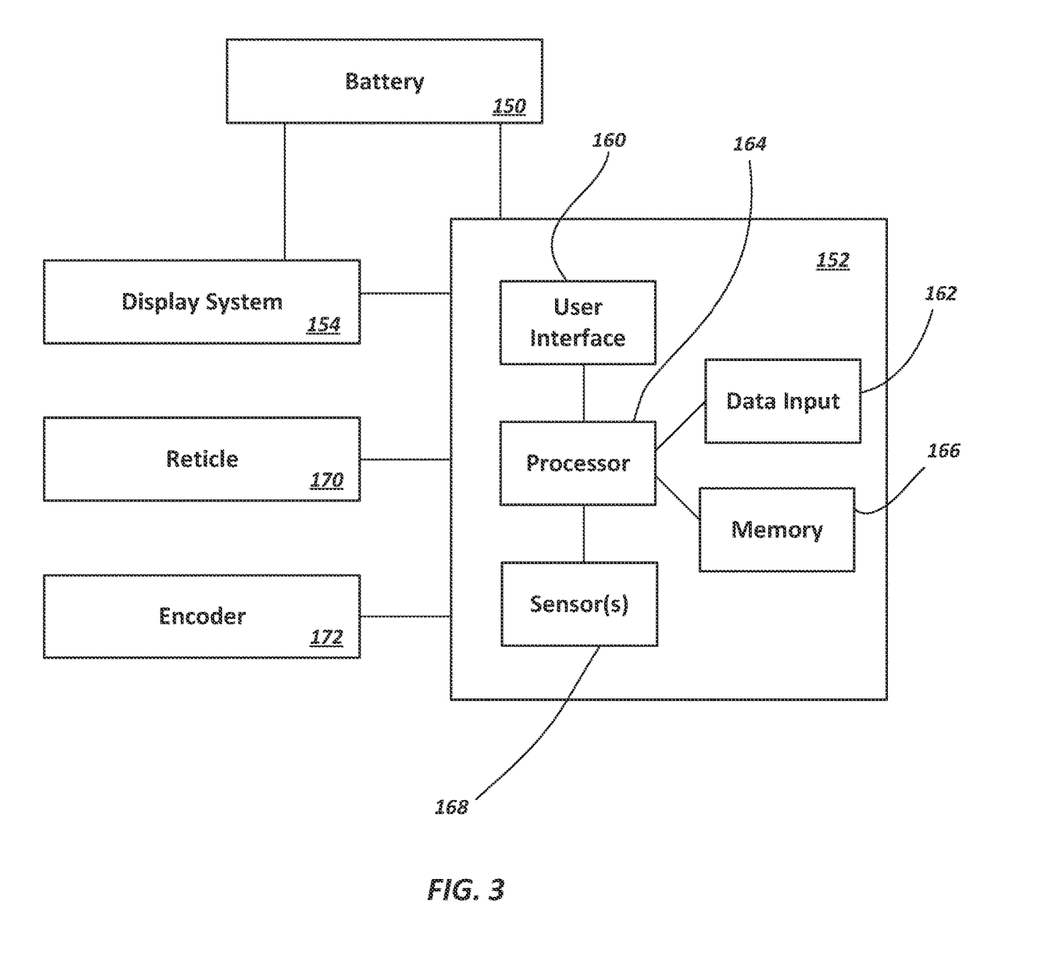
FIG. 3 is a block diagram of various electronic components of the riflescope according to an embodiment of the disclosure.

FIG. 3 shows a block diagram depicting various electronic components utilized in a riflescope according to an embodiment of the present disclosure. The control module 152 may include, without limitation, a user interface 160, data input device 162, a processor 164, memory 166, and one or more sensors 168.

The user interface 160 may include a plurality of input and/or output devices such as buttons, keys, knobs, touchscreens, displays, speakers, microphones, etc. Some components of the user interface 160 such as, for example, buttons, may be used to manually enter data such as, for example, wind data, display intensity data, reticle intensity data, ballistic profile data, ballistic coefficient data, muzzle velocity data, primary zero data, static conditions of the rifle-scope system, GPS coordinate data, compass coordinate data, sight-above-bore data, etc. This data may be received by the processor 164 and saved into the memory 166. The data may also be used by the processor 164 in an algorithm or to execute an algorithm.

The data input device 162 may include wired or wireless communications devices and/or may include any type of data transfer technology such as, for example, a USB port, a mini USB port, a memory card slot (e.g., a microSD slot), NFC transceiver, Bluetooth® transceiver, Firewire, a ZigBee® transceiver, a Wi-Fi transceiver, a device compliant with an IEEE 802.11 wireless communication standard, cellular communication devices, and the like. It is noted that, while termed a data input device, such may be used in two way communications, providing data output as well.

The processor 164 may be any type of processor known in the art that may receive inputs, execute algorithms and/or processes, and may include, without limitation, one or more general-purpose processors and/or one or more special-purpose processors (such as digital signal processing chips, graphics acceleration chips, and/or the like). The processor 164 may be used to control various processes, algorithms, and/or methods in the operation of the riflescope. The processor 164 may control operation of a display system 154 and/or a reticle 170. The processor 164 may also receive inputs from the user interface 160, the data input 162, the memory 166, the sensor(s) 168, a position encoder 172 associated with the position of an adjustable component (e.g., the vertical adjustment knob 130, the windage adjustment knob 134 or the parallax dial 132), and/or from other sources.

The memory 166 may include any type of digital data storage such as such as random access memory ("RAM") and/or read-only memory ("ROM"), which can be programmable, flash-updateable, and/or the like. In other embodiments, the memory may include memory from an externally connected device including, for example, a disk drive, a drive array, an optical storage device, or a solid-state storage device. In some embodiments, the memory 166 may be configured to store ballistic information that includes data that can be used, for example, to correct for the amount a bullet may drop over a given distance and/or the horizontal deflection of the bullet.

Data may be entered from another device (e.g., the processor 164 may receive data via the data input device 162 which may be entered from another device such as computer, laptop, GPS device, a rangefinder, tablet, or smartphone, etc.) and stored into the memory 166. Such data may include, for example, calibration data, a ballistic profile lookup table that cross-references rotational data and/or linear data with shoot-to-range values, rifle data, projectile data, user data, etc.

The sensor(s) 168 may be used to sense any of a variety of environmental conditions or characteristics associated with the use of the riflescope. For example, the sensor(s) 168 may sense atmospheric conditions (such as humidity, temperature, pressure, etc.), inclination, rifle cant, and/or the sight direction of the rifle (compass direction). While a single sensor is shown, any number of sensors may be included. Sensor data may be recorded by the processor 164 and saved into the memory 166 and/or used in the processing of instructions for operation of the riflescope 100.

The battery 150 may be connected to the control module 152 and/or the internal display system 154. In some embodiments, the battery may be directly coupled with the reticle 170 and/or the position encoder 172. In some embodiments, the battery 150 may also be directly coupled with processor, 164, the sensor(s) 168, the memory 166, and/or other components of the riflescope 100. The battery 150 may include any type of battery power source without limitation.

The control module 152 may also include software elements, which may be located within working memory 166. The software elements may include an operating system and/or other code, such as one or more application programs.

Figure 4:
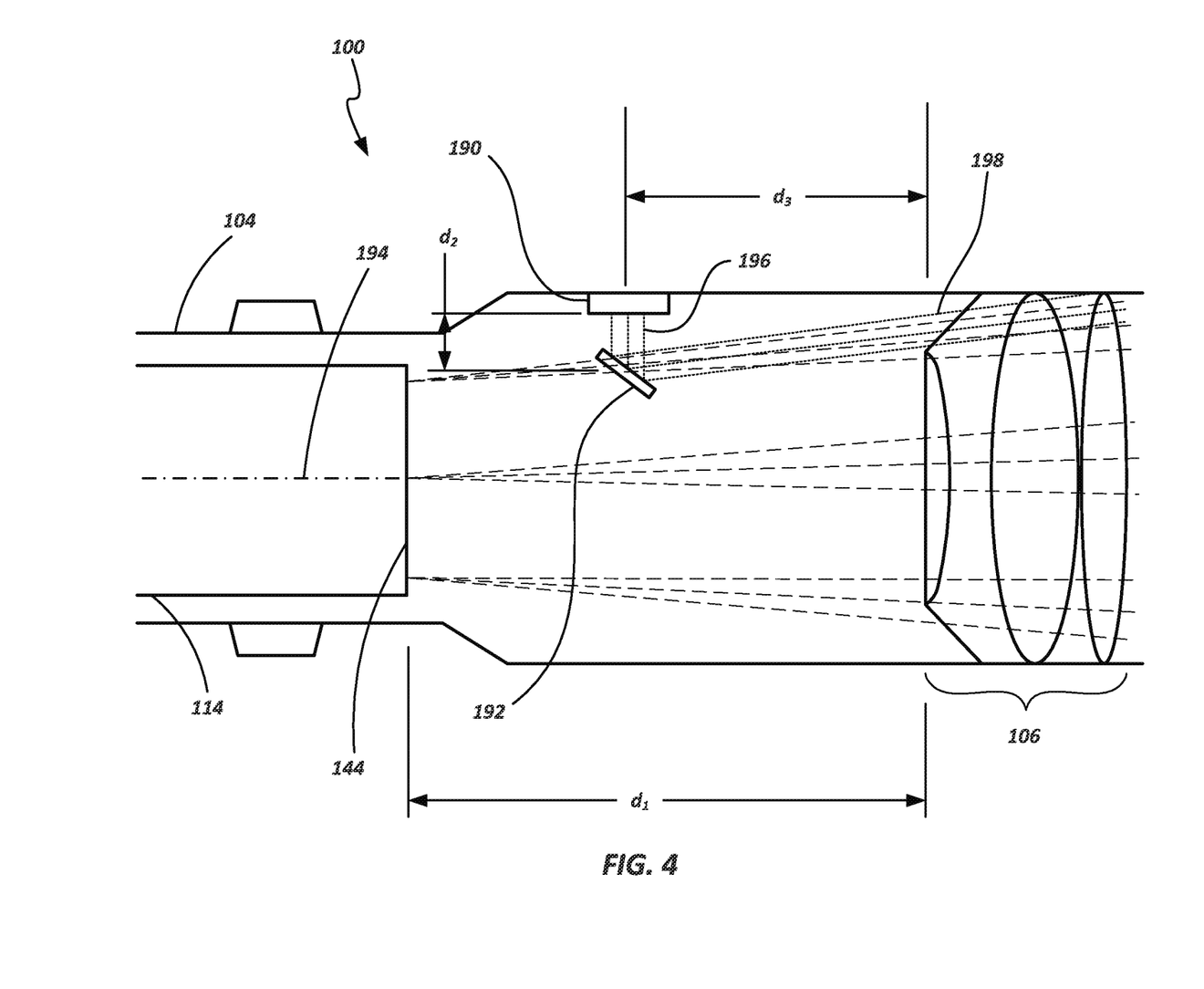
FIG. 4 illustrates a portion of a riflescope including a display in accordance with an embodiment of the present disclosure.

Referring now to FIG. 4, a schematic is shown illustrating a portion of the riflescope including an ocular system 106, a portion of the main tube 104, and a display system 154 according to an embodiment of the present disclosure. The display system 154 may include an internal display 190 (i.e., a display located within the housing or body of the riflescope 100) and a mirror 192 that is disposed between the ocular system 106 and a second focal plane 144. In some embodiments, the mirror 192 may include a beam splitter or a prism. As shown in FIG. 4, the display 190 may be oriented such that it emits light in a direction that is substantially perpendicular to the optical axis 194. The internal display 190 may include an LCD display, an organic light-emitting diode display, an e-ink display, a plasma display, a segment display, an LED display, an electroluminescent display, a plasma display, a surface-conduction electron-emitter display, a quantum dot display, etc. In some embodiments, the display system may be dimmed or darkened to aid the user in viewing the target and/or to save power. The digital display may be dimmed, for example, in response to a button being pressed by the user through a user interface. Alternatively, the digital display may only be active in response to a button press.

The mirror 192 may be positioned to reflect light from the internal display 190 to the user's eye through the ocular system 106. For example, if the internal display 190 is positioned to emit light 196 in a direction that is perpendicular to the optical axis 194, the mirror 192 may be placed in the path of the emitted light 196 from the internal display 190. In addition, the mirror 192 can be angled at approximately 45° relative to the path of the emitted light 196 from the internal display 190. In so doing, the reflected light 198 can travel in a direction that is substantially parallel to one or more optical paths exiting the second focal plane 144, as shown in FIG. 4. Alternatively, the internal display 190 and the mirror 192 may be arranged at other angles such that the reflected light 198 may travel in a direction that is substantially parallel to one or more optical paths exiting the second focal plane 144.

As seen in FIG. 4, there is a first distance $d_1$ between the second focal plane 144 and a predetermined point associated with the ocular system 106 (e.g., a plane associated with a lens of the ocular system). Additionally, there is a second distance $d_2$ between the display 190 and the mirror 192. Finally, there is a third distance $d_3$ between the mirror and the predetermined point associated with the ocular system 106. In one embodiment, the first distance $d_1$ may be equal to the sum of the second distance $d_2$ and the third distance $d_3$ (i.e., $d_1=d_2+d_3$). In one particular example, the first distance $d_1$ may be approximately 30 millimeters (mm), while the second distance is approximately 10 mm and the third distance is approximately 20 mm. Of course none of these distances are to be considered limiting and other distances are contemplated depending on individual optics design of the riflescope, including the contemplation of different combinations of distances $d_2$ and $d_3$ (e.g., the ratio of $d_2/d_3$ is not limited to 1:2).

Put another way, the effective distance between the display and the defined point or plane associated with the ocular system 106 is equal to the distance between the second focal plane and the defined point or plane associated with the ocular system 106. Stated yet another way, the folded optical path between the display and a defined point of the ocular system 106 is equal to the optical path between second focal plane 144 and the defined point of the ocular system 106.

Figure 5:
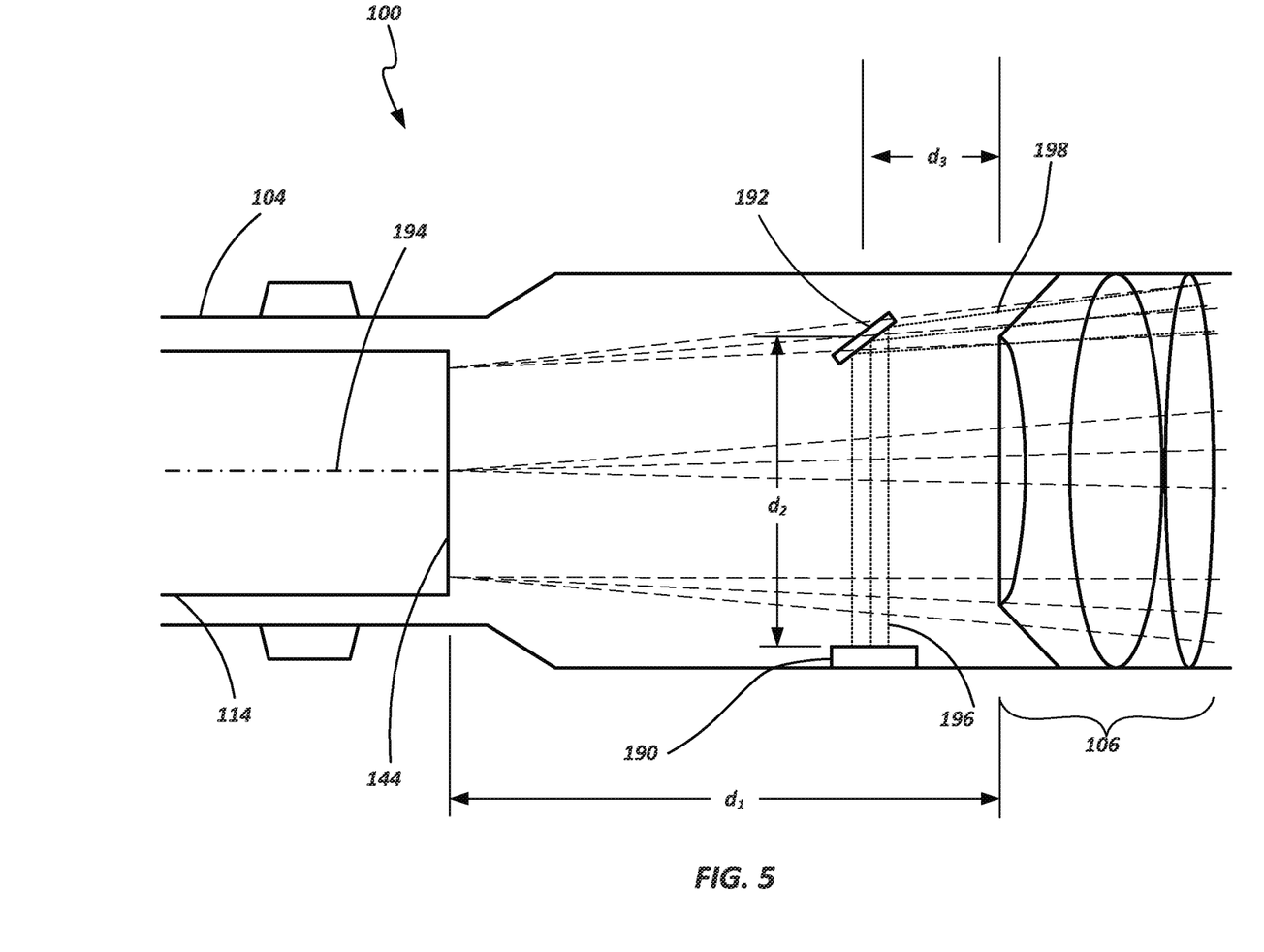
FIG. 5 illustrates a portion of a riflescope including a display in accordance with another embodiment of the present disclosure.

Referring to FIG. 5, a schematic is shown illustrating a display system 154 according to another embodiment. As with the embodiment depicted in FIG. 4, the display system 154 may include an internal display 190 and a mirror 192 that is disposed between the ocular system 106 and a second focal plane 144. Similarly, the display 190 and 192 may be arranged such that the effective distance (or distance of a folded optical path) between the display and a defined point of the ocular system 106 is equal to the distance between the second focal plane 144 and the defined point of the ocular system 106. In other words, $d_1=d_2+d_3$ again. However, in the embodiment illustrated in FIG. 5, the display is located at a lower portion of the riflescope 100 in contrast to being located in the upper portion of the riflescope as depicted in FIG. 4 (considering the riflescope 100 to be in an orientation of intended use as shown in FIGS. 4 and 5). Additionally, the mirror 192 is positioned on an opposing surface (i.e., it remains located adjacent the upper portion of the riflescope 100) and is angled to reflect light transmitted from the display through the ocular system 106. Furthermore, in the embodiment shown in FIG. 5, both the display 190 and the mirror 192 have been moved further away from the second focal plane 144 and closer to the ocular system 106 as compared to the embodiment illustrate in FIG. 4.

Still referring to the embodiment in FIG. 5, in one example, the first distance $d_1$ may be approximately 30 mm while the second distance $d_2$ is approximately 20 mm and the third distance $d_3$ is approximately 10 mm. As with the embodiment illustrated in FIG. 4, other distances are contemplated, including different combinations of distances $d_2$ and $d_3$ (e.g., the ratio of $d_2/d_3$ is not limited to 2:1).

Figure 6:
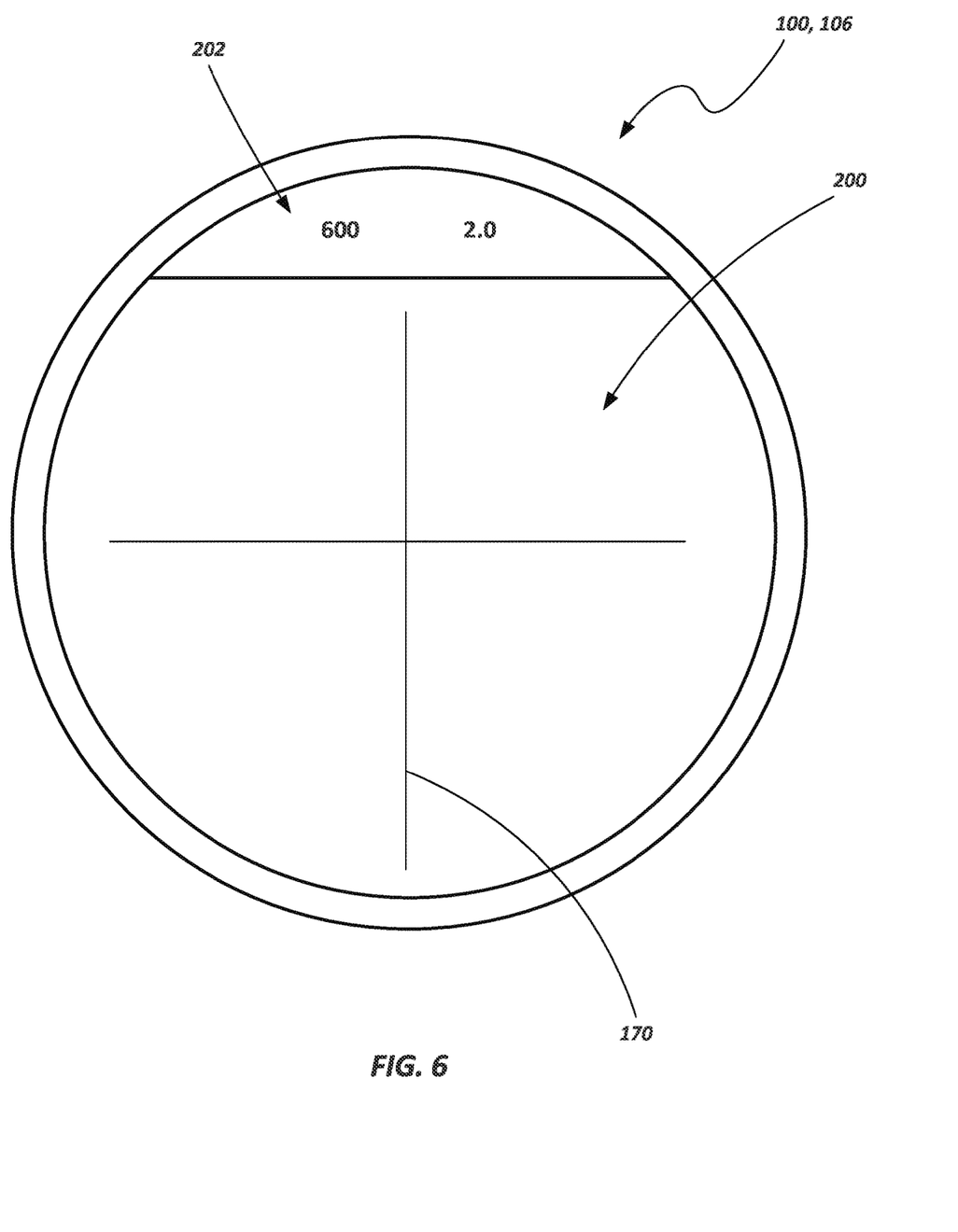
FIG. 6 depicts a view that may be seen by a user looking through a riflescope according to an embodiment of the disclosure.

The incorporation of a display system 154 that employs an optical path having an effective length equal to the distance between the associated focal plane and the ocular system provides various advantages including considerable flexibility in the placement of components and maintaining a large viewfinder that is not unduly obstructed by the display. For example, as shown in FIG. 6, a view that may be seen by a user looking through the ocular system 106 of the riflescope 100 is illustrate. The view may include a so-called "live view" 200 of a scene or target being surveilled by a user of the riflescope (this includes the light passing through the objective system, the main tube and the ocular system 106) as well as a display view 202 which may include a variety of information such as described hereinabove (shown as text data "600" and "2.0" in FIG. 6). In one embodiment, the display view 202 only consumes approximately 10% of the overall view presented to the viewer. Additionally, the display system 154 is configured such that the actual display 190 (i.e., the hardware component that emits light) is not located within the field of view of a user. Further, it is noted that a display system 154 such as described herein provides a high contrast reflection (display view 202) that enables the display to operate at lower luminance levels and, thus, at lower power levels.

While the view shown in FIG. 6 depicts the display view 202 at the upper portion of the image (consistent with the example embodiments illustrated in FIGS. 4 and 5), it is noted that the display system 154 may be arranged to provide a display view at other locations. For example, the display system 154 may include a mirror 192 located and oriented to provide a display view 202 along either side of the view through the riflescope 100, or at the bottom of view through the riflescope 100, or at some other location within the riflescope view.

In some embodiments, the live view 200 may be overlaid with an image of a reticle 170 in any shape or pattern. In one embodiment, the reticle 170 may be placed within the first focal plane of the riflescope 100 (see, e.g., FIG. 2). The reticle 170 may be constructed from optical material, such as optical glass or plastic or similar transparent material, and/or may take the form of a disc or wafer with substantially parallel sides. The reticle 170 may, for example, be constructed from wire, nano-wires, an etching, or may be analog or digitally printed, or may be projected (for example, on a surface) by, for example, a mirror, video, holographic projection, or other suitable means on one or more wafers of material. In some embodiments, the reticle 170 may include an illuminated reticle. An illuminated reticle may be etched into an optical surface, the etching being backfilled in with a reflective material such as, for example, titanium oxide, that illuminates when a light or diode powered by, for example, a battery, chemical, or photovoltaic source, is rheostatically switched on.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A riflescope, comprising:
a main tube;
an objective lens coupled to a first end of the main tube;
ocular lenses coupled to a second end of the main tube, the objective lens and the ocular lenses defining a first focal plane and a second focal plane; and
a display system disposed between the ocular lenses and the second focal plane, the display system comprising a display and a reflective element, the display system configured to project an image to the ocular lenses, wherein:
the ocular lenses are positioned closer to the second focal plane than the first focal plane;
the ocular lenses comprise a first ocular lens and a second ocular lens, the second ocular lens being positioned farther away from the second focal plane than the first ocular lens;
the second focal plane is positioned a first distance from the first ocular lens;
the display is positioned an effective distance from the first ocular lens, the effective distance defining a folded optical path configured to render the image perceivable to a user of the riflescope, and the effective distance being substantially equivalent to the first distance; and
the display and the reflective element are disposed on a common side of an optical axis extending from the objective lens through the ocular lenses.

2. The riflescope of claim 1, wherein the display is configured to emit light in a direction that is substantially perpendicular to an optical axis of the riflescope.

3. The riflescope of claim 1, wherein the reflective element is oriented at an angle of approximately 45° relative to the display.

4. The riflescope of claim 1, wherein the reflective element is a prism, a beam splitter, or a mirror.

5. The riflescope of claim 1, wherein the folded optical path extends from the display to the reflective element and from the reflective element to the ocular lenses.

6. The riflescope of claim 1, wherein the image includes information for the user, the information including a distance to a target, an atmospheric condition, or an environmental condition.

7. A riflescope comprising:
a main tube;
an objective lens coupled to a first end of the main tube;
one or more ocular lenses coupled to a second end of the main tube, the objective lens and the one or more ocular lenses defining a first focal plane and a second focal plane; and
a display system disposed between the one or more ocular lenses and the second focal plane, the display system comprising a display and a reflective element; wherein:
the one or more ocular lenses are positioned closer to the second focal plane than the first focal plane;
the second focal plane is positioned a first distance from the one or more ocular lenses;
the display is positioned a second distance from the reflective element; the display being positioned along a bottom interior surface of the main tube;
the reflective element is positioned a third distance from the one or more ocular lenses, the reflective element being positioned above an optical axis extending longitudinally through a center of the main tube, the reflective element being positioned adjacent to a top interior surface of the main tube opposite the bottom interior; and
a sum of the second distance and the third distance is approximately equal to the first distance.

8. The riflescope of claim 7, wherein:
the one or more ocular lenses comprise a first ocular lens and a second ocular lens, the second ocular lens being positioned farther away from the second focal plane than the first ocular lens; and
the third distance extends from the reflective element to the first ocular lens.

9. The riflescope of claim 7, wherein the reflective element is a prism, a beam splitter, or a mirror.

10. The riflescope of claim 7, further comprising a reticle disposed within the first focal plane.

11. The riflescope of claim 7, wherein the display comprises an organic light-emitting diode (OLED), a liquid crystal (LC), an e-ink, a plasma, a light emitting diode (LED), or quantum dots.

12. A riflescope comprising:
a main tube;
an objective lens coupled to a first end of the main tube;
one or more ocular lenses coupled to a second end of the main tube, the objective lens and the one or more ocular lenses defining a first focal plane and a second focal plane; and
a display system disposed between the one or more ocular lenses and the second focal plane, the display system comprising a display and a reflective element, the display system configured to project an image to the one or more ocular lenses, wherein:
the one or more ocular lenses are positioned closer to the second focal plane than the first focal plane;
the second focal plane is positioned a first distance from the one or more ocular lenses;
the display and the reflective element are disposed on either a common side or opposing sides of an optical axis extending from the objective lens through the one or more ocular lenses;
the display is positioned an effective distance from the one or more ocular lenses, the effective distance defining a folded optical path configured to render the image perceivable to a user of the riflescope; and
the effective distance is substantially equivalent to the first distance.

13. A riflescope comprising:
a main tube;
an objective lens coupled to a first end of the main tube;
one or more ocular lenses coupled to a second end of the main tube, the objective lens and the one or more ocular lenses defining a first focal plane and a second focal plane; and
a display system disposed between the one or more ocular lenses and the second focal plane, the display system comprising a display and a reflective element; wherein:
the one or more ocular lenses are positioned closer to the second focal plane than the first focal plane;
the display and the reflective element are disposed on either a common side or opposing sides of an optical axis extending from the objective lens through the one or more ocular lenses;
the second focal plane is positioned a first distance from the one or more ocular lenses;
the display is positioned a second distance from the reflective element;
the reflective element is positioned a third distance from the one or more ocular lenses; and
a sum of the second distance and the third distance is approximately equal to the first distance.

* * * * *